Aug. 12, 1958   F. B. HOLT ET AL   2,847,630
MACHINES HAVING INDUCTION MOTOR DRIVES
Filed Nov. 16, 1953
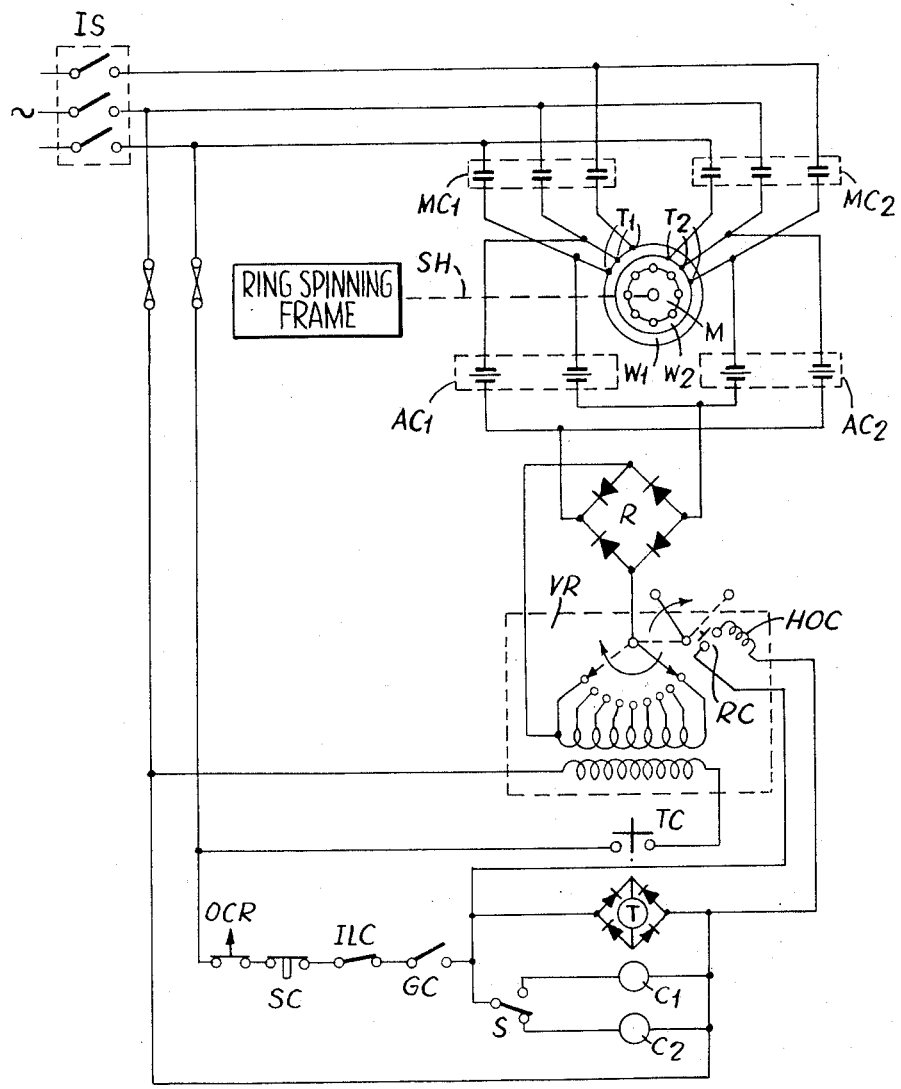
INVENTORS
FREDERICK B. HOLT
GEORGE P. F. NEWLANDS
ALFRED COTTON
By Norris & Bateman
Attorneys

United States Patent Office 2,847,630
Patented Aug. 12, 1958

2,847,630

MACHINES HAVING INDUCTION MOTOR DRIVES

Frederick Brereton Holt, Antrobus, near Northwich, George Peter Fleming Newlands, Davyhulme, and Alfred Cotton, Bolton, England, assignors to Metropolitan-Vickers Electrical Company Limited, London, England, a British company Application November 16, 1953, Serial No. 392,426

Claims priority, application Great Britain November 20, 1952

3 Claims. (Cl. 318—212)

This invention relates to machines provided with squirrel cage induction motor drives, particularly machines in which it is desirable that any acceleration or deceleration of the machine, such as on starting or when changing to a higher or lower operating speed, shall be effected smoothly. Such machines are, for instance, those employed for textile spinning, doubling or the like, or for making or finishing paper or other easily torn fabric; it will be appreciated that if such a machine were to accelerate or decelerate too suddenly it would tend to "snatch" at the material being processed and possibly break or tear the material as a consequence.

For machines provided with a fast and loose pulley drive, control of its acceleration, for instance on starting, can be effected by a skilled operator by control of the belt on its movement from the loose to the fast pulley. No such control is available however in the case of machines having an electric motor drive coupled directly thereto, for which drive in applications such as those mentioned, it is preferred for reasons of simplicity and economy to employ squirrel cage induction motors with direct-on line starting. While the employment of such motors is satisfactory from most points of view it has the disadvantage that the starting torque normally obtained with such motors may be too great to give a starting acceleration sufficiently slow to avoid damage to the material being processed.

It is an object of the invention to provide an improved arrangement which provides a squirrel cage induction motor drive and enables acceleration and/or deceleration of equipment driven thereby to be controlled.

Accordingly the invention provides, for equipment requiring to be driven with controlled acceleration or deceleration, a driving arrangement which comprises a multiple-wound squirrel cage induction machine (that is, having more than one winding on its primary side) coupled to a driving shaft for the equipment and having at least one of its multiple windings capable of being supplied with alternating current to drive the equipment, together with means for applying direct current to at least one other of the multiple windings when the machine is being accelerated or decelerated whereby to provide a braking action on the equipment.

The braking section(s) of the multiple windings may be specially provided or designed solely with a view to the braking effect which they are required to produce when energised with direct current; alternatively, where the driven equipment is to be capable of operation at two or more different speeds, as will be described below, the various winding sections of the multiple-wound machine may be arranged so that they can be selectively excited with alternating current to drive the equipment respectively at different speeds, the direct current for effecting the braking action being applied to a winding section which is not at the time being used for driving.

The squirrel cage (secondary) windings of the induction machine employed in the invention may be of either the single- or multi-cage type.

It is contemplated that the magnitude of the braking torque required for controlling the acceleration or deceleration and the time for which such torque will have to be applied will be sufficiently small not to give rise to difficulty in dissipating the heat generated in the squirrel cage of the braking machine. Moreover it is well known that over the usual working range the braking torque which can be provided by an induction machine to which direct current has been applied is dependent, for a given applied direct current, on the ratio of resistance to reactance in the secondary circuit of the machine. This ratio is inherently higher the smaller the machine, and since the horse-power rating required for the envisaged applications of the invention is generally of a low order, for instance twenty horse-power and less, the direct current necessary to give the required braking torque will correspondingly be smaller.

The present invention is particularly applicable for controlling the acceleration of textile or other equipment during starting, at which time one of the winding sections of a multiple-wound machine will be supplied with alternating current to drive the equipment. The braking torque produced by supplying direct current to another of the winding sections, will determine the starting acceleration and it is preferably arranged that the direct current excitation can be regulated at will by an operator so that he can control the braking torque and thus the starting acceleration to an optimum value, it being generally permissible as the driven equipment gathers speed to decrease the braking torque so as to allow a progressively greater rate of acceleration. It is conceivable that in some circumstances the control of the direct current excitation might alternatively be arranged to be effected automatically as the machine gathers speed but generally, at least in so far as textile equipment is concerned, the control of acceleration will be left to the operator who will be able to judge what rate of acceleration is permissible at any given time during the starting period and to make any necessary adjustments.

On stopping the equipment, it may be arranged that when the alternating current supply is disconnected from the appertaining winding section, direct current is applied to any or each of the winding sections, thereby to effect a braking action assisting smooth stopping of the equipment. The direct current thus applied, which may have the maximum value available for application during starting or some lower value, may be maintained for a definite length of time by a time delay relay arranged to cut off the direct current when the equipment and machine(s) have come to rest. Alternatively, the rate of deceleration during the stopping period may be controlled by applying a relatively low direct current at the beginning of such period and progressively increasing the direct current thereby to increase the braking effect and thus bring the equipment smoothly to a standstill. In case the braking action provided by applying direct current after disconnecting the alternating current as just described should result in a rate of deceleration so great as to be likely to break or tear the material being handled by the equipment, the alternating current may be left connected to the appertaining winding section, and the direct current applied to another winding section to slow the equipment down, the alternating current subsequently being disconnected when the speed of the equipment has reached a sufficiently low value.

The invention can with advantage be employed in connection with equipment such as textile ring spinning frames in which it may be desired to run the equipment at one speed during one part of a spinning or other operation and at a higher or lower speed during a subsequent part of the operation. For instance in the case of ring spinning, while it is desirable that for maximum production the highest possible speed should be used during the major part of the winding of each package; it is also desirable to run the frame at a lower speed at the beginning and perhaps also at the end of the spinning process in order to reduce end breakages.

Thus in applying the present invention to equipment which is to be selectively operated at two or more different speeds, means may be provided for applying alternating current selectively to one or another of the winding sections of a multiple-wound induction machine, thereby to drive the equipment, together with means for applying direct current to another winding section when the equipment is being accelerated or decelerated whereby to provide a braking action, the several windings of the multiple-wound machine being arranged so as when energised with alternating current to drive the equipment at respective speeds corresponding to the different speeds required.

In order that the invention may be more fully understood, there will now be described with reference to the accompanying drawing a particular starting arrangement in accordance with the invention providing a two speed drive for equipment which for the purposes of the description will be assumed to be a spinning frame.

Referring to the drawing, a single two-speed squirrel cage induction machine M is permanently coupled with the spinning frame (shown diagrammatically) to drive it through a driving shaft SH. The machine M has two stator windings W1 and W2 of which winding W1 is connected to terminals T1 and on energization with alternating current will drive the machine at one speed, and winding W2 is connected to the terminals T2 and on energization with alternating current will cause the machine to drive at a different speed. With the two stator windings are associated respective contactors having normally-open main contacts MC1, MC2, respectively, which when closed connect the appertaining stator winding W1 or W2 to an A. C. supply, preferably through a common isolating switch IS. The contactors also have normally-closed auxiliary contacts AC1, AC2, respectively, which normally connect two phases of the respective stator windings W1 and W2 across the output terminals of a common rectifying device R.

The rectifying device R, which can be of any well-known form and preferably effects full wave rectification, is arranged to be fed with a variable alternating voltage from a voltage regulator VR connected with the A. C. supply. The regulator VR, here assumed to be mechanically operated, comprises any suitable device providing a variable voltage output from a constant voltage input, such for example as a voltage regulating transformer or a resistance regulator associated with a winding of a step-down transformer. In some cases, where a D. C. supply is available the rectifier R may be omitted and the auxiliary contacts AC1 and AC2 on the contactors arranged normally to connect the two phases of the stator windings W1 and W2 to a regulator providing a variable D. C. voltage from the D. C. supply.

Respective operating coils C1 and C2 for the contactors are connected with a selector switch S, the position of which determines which one of the contactor coils C1 or C2 is connected to the A. C. supply through "start" and "stop" contacts GC and SC respectively, this circuit normally also including the contacts OCR of an over-current relay and any interlock switches ILC which may be provided in the equipment. Separate "start" and "stop" contacts GC and SC may be provided (as shown) with the "start" contacts arranged to be automatically reopened after opening of the "stop" contacts; alternatively the same contacts may serve for both starting and stopping, being closed to start and reopened to stop. In either case, it will generally be arranged for the "stop" contacts to be operated by means of an easily accessible push button.

In parallel with the contactor operating coils C1 and C2 and the selector switch S, but in series with the "start" and "stop" contacts GC and SC, is connected the operating coil T of a relay having a delayed drop-out characteristic and arranged with normally open contacts TC thereon in circuit with the regular VR so that on closure of the "start" contacts GC (the circuit for the contactor coil C1 or C2 being otherwise completed) the relay T will pick up to render the D. C. voltage available for application to the stator windings. When the contactor coil circuit is subsequently re-opened as by opening the "stop" contacts SC, the contacts T1 of the relay will re-open to remove the D. C. voltage after a predetermined time has elapsed.

The regulator VR is normally biased in any well known manner to a position at which maximum D. C. voltage is provided for application to the stator windings W1, W2, a hold-on coil HOC being provided in the regulator to hold the regulator in its position corresponding to minimum D. C. voltage once it been operated to this latter position. The hold-on coil HOC is connected in series with the "start" and "stop" contacts GC and SC and with hold-on contacts RC which are arranged to be closed by the regulator VR on reaching its position corresponding to minimum voltage, arrangements by which this may be effected being readily apparent to those skilled in the art.

In operation of the arrangement illustrated, closure of the "start" contacts GC will result in one or other of the main contactor coils C1 or C2 being energised, depending on the position of the selector switch S. Assuming the contactor coil C1 is thus selected, the stator winding W1 will be connected to the A. C. supply through the main contacts MC1 of the energised contactor C1, thereby to become the driving winding for the machine M, while the auxiliary contacts AC1 on this contactor open to disconnect the driving winding W1 from the rectifier R or, in the case where a D. C. supply is available and the rectifier is omitted, from the D. C. voltage regulator. The closure of the "start" contacts GC also brings about energisation of the time delay relay T, the contacts TC of which thus close resulting in the application of the direct current to the other (braking) winding W2 through the auxiliary contacts AC2 of its contactor C2 which is at this time de-energised.

The regulator is at this stage in its position corresponding to maximum output voltage so that maximum direct current is applied to the braking winding to give a maximum braking effect in accordance with well-known principles. The machine M, and with it the spinning frame, thus starts up slowly on account of the load imposed by the braking winding W2 in addition to the load imposed by the spinning frame itself. Thereafter the rate of acceleration of the machine M and thus the frame can be progressively increased by operating the regulator VR towards its minimum voltage position. When this latter position is reached, which may be before the frame has been accelerated up to full speed, the hold-on coil HOC is energised through the hold-on contacts RC thereby to maintain the regulator VR in this position.

It will normally be arranged that once the machine M is operating at full speed a switch (not shown) is operated to interrupt the supply of direct current to the braking winding W2; alternatively, the supply of direct current to the braking winding may be arranged to be interrupted at any predetermined time during the accelerating period so that the acceleration will thereafter be at the maximum rate corresponding to the particular speed of the machine.

If at any time during the operation of the frame it is desired to change the speed to that provided by the other stator winding W2, this may be effected simply by changing over the selector switch S so that the previously energised contactor coil C1 will be de-energised and the other contactor coil C2 energised, thereby to disconnect the stator winding W1 from the A. C. supply, and to connect the other stator winding W2 which thus takes over the drive.

To stop the frame the "stop" contacts SC are opened thereby de-energising both the energised contactor coil C1 or C2 as the case may be and also the hold-on coil HOC for the regulator VR which thus returns to its position corresponding to maximum voltage. If the contactors C1 and C2 have a relatively short release time, then since the auxiliary contacts AC1 and AC2 on both contactors are now closed, direct current is applied to both stator windings W1 and W2, which therefore both exert a braking action on the machine M to stop the frame. The time delay relay T is also de-energised by the opening of the "stop" contacts SC, and after this relay has timed out its contacts TC will interrupt the D. C. excitation of the stator windings, the delay time being so chosen that the frame has come to a standstill before the D. C. excitation is removed.

An alternative operation on stopping may be obtained by providing the contactors C1 and C2 with a delayed drop-out characteristic. The effect would then be that following operation of the "stop" contacts SC, the stator winding W1 or W2 associated with the last energized contactor would remain energized with alternating current for a predeterminable time during which, and until relay T has timed out, a braking action is exerted by the other winding by virtue of the direct current then being applied thereto from the voltage regulator by the contacts AC1 or AC2 of the other contactor.

What we claim is:

1. In combination with electrically driven equipment provided with squirrel cage induction motor drive and requiring to be started smoothly to avoid snatching, means for driving the equipment with controlled starting acceleration comprising a multiple-wound squirrel cage induction machine directly coupled with the equipment, together with means for temporarily applying to one winding of said machine, concurrently with application of energising alternating current to another winding of the machine to start up the equipment, direct current effective to cause the first mentioned winding to exert a retarding action on said machine thereby to limit the starting acceleration of the equipment, said direct current being progressively reduceable from an initial maximum value to permit progressively increasing acceleration during the starting period.

2. Equipment as claimed in claim 1 wherein said multiple-wound machine is capable of giving different driving speeds in dependence on which winding thereof is energised with alternating current, and wherein means is provided for selectively energising with alternating current that winding which gives a desired driving speed for the equipment, said means for temporarily applying direct current during the starting period being arranged to selectively apply such direct current to a winding of said induction machine not then energised with alternating current.

3. Equipment as claimed in claim 1 combining also means for permitting controlled stopping deceleration thereof comprising means effective during a stopping period and while maintaining the existing alternating current excitation of that winding of the induction machine which is at the time being excited for driving the equipment, to apply to another winding of said machine direct current effective to cause said other winding to exert a braking action on the machine thereby to effect smooth deceleration of the equipment, together with means for disconnecting said alternating current from the first mentioned winding of the induction machine when the equipment has reached a sufficiently low speed.

References Cited in the file of this patent

UNITED STATES PATENTS

| | | |
|---|---|---|
| 2,196,402 | Snyder | Apr. 9, 1940 |
| 2,227,467 | Sweeny | Jan. 7, 1941 |
| 2,493,670 | Harvey et al. | Jan. 3, 1950 |
| 2,677,087 | Willmot | Apr. 27, 1954 |
| 2,691,751 | Schaelchin | Oct. 12, 1954 |

FOREIGN PATENTS

| | | |
|---|---|---|
| 673,908 | Great Britain | June 11, 1952 |
| 679,703 | Great Britain | Sept. 24, 1952 |